(12) United States Patent
Higgins et al.

(10) Patent No.: US 8,856,167 B2
(45) Date of Patent: Oct. 7, 2014

(54) SYSTEM AND METHOD FOR CONTEXT BASED QUERY AUGMENTATION

(75) Inventors: Christopher W. Higgins, Portland, OR (US); Marc Eliot Davis, San Francisco, CA (US); Christopher T. Paretti, San Francisco, CA (US); Simon P. King, Berkeley, CA (US); Rahul Nair, Sunnyvale, CA (US); Carrie Burgener, Mountainview, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/251,779

(22) Filed: Oct. 3, 2011

(65) Prior Publication Data

US 2012/0078938 A1    Mar. 29, 2012

Related U.S. Application Data

(63) Continuation of application No. 12/329,038, filed on Dec. 5, 2008, now Pat. No. 8,055,675.

(51) Int. Cl.
*G06F 17/30* (2006.01)
*G06F 7/00* (2006.01)

(52) U.S. Cl.
CPC ................ *G06F 17/3064* (2013.01)
USPC ............ 707/769; 707/711; 707/725; 707/765

(58) Field of Classification Search
None
See application file for complete search history.

(56) References Cited

U.S. PATENT DOCUMENTS

| | | | | |
|---|---|---|---|---|
| 6,064,978 | A * | 5/2000 | Gardner et al. | 705/7.32 |
| 6,324,519 | B1 * | 11/2001 | Eldering | 705/14.66 |
| 6,501,937 | B1 * | 12/2002 | Ho et al. | 434/362 |
| 6,816,850 | B2 * | 11/2004 | Culliss | 707/711 |
| 6,834,195 | B2 * | 12/2004 | Brandenberg et al. | 455/456.3 |
| 7,185,286 | B2 * | 2/2007 | Zondervan et al. | 715/762 |
| 7,577,665 | B2 * | 8/2009 | Ramer et al. | 1/1 |
| 7,953,720 | B1 * | 5/2011 | Rohde et al. | 707/706 |
| 8,346,753 | B2 * | 1/2013 | Hayes | 707/709 |
| 8,375,048 | B1 * | 2/2013 | Wad et al. | 707/767 |
| 2003/0069880 | A1 * | 4/2003 | Harrison et al. | 707/3 |
| 2005/0065950 | A1 * | 3/2005 | Chaganti et al. | 707/100 |
| 2009/0186330 | A1 * | 7/2009 | Brownholtz et al. | 434/362 |

* cited by examiner

*Primary Examiner* — Kaveh Abrishamkar
*Assistant Examiner* — James J Wilcox
(74) *Attorney, Agent, or Firm* — James J. DeCarlo; Greenberg Traurig, LLP

(57) ABSTRACT

A system and method for context based query augmentation. A question is received over a network from a questioning user comprising an identification of a user and at least one question criteria. A first query is formulated so as to search for user profile data, social network data, spatial data, temporal data and topical data in order to identify user context data relevant to question criteria. The question is modified using the user context data to create at least one modified question having at least one additional criteria based on the user context data. A second query is formulated so as to search for knowledge data, user profile data, social network data, spatial data, temporal data and topical data in order to identify knowledge data relevant to the identified user and the modified question criteria. The knowledge data is transmitted to the questioning user.

21 Claims, 12 Drawing Sheets

SYSTEM AND METHOD FOR CONTEXT BASED QUERY AUGMENTATION

CROSS REFERENCE TO RELATED APPLICATIONS

This application is a continuation of, and claims priority from co-pending U.S. patent application Ser. No. 12/329,038, filed on Dec. 5, 2008, entitled SYSTEM AND METHOD FOR CONTEXT BASED QUERY AUGMENTATION, which is incorporated herein by reference.

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for managing data relating to users on a network and, more particularly, to systems and methods for managing data relating to users on a network which is drawn, in part, from third party sources.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method. A question is received, over a network, from a questioning user, the question comprising an identification of a user and at least one question criteria. A first query is formulated so as to search, via the network, for user profile data, social network data, spatial data, temporal data and topical data that is available via the network and relates to the question criteria and the identified user so as to identify user context data relevant to question criteria. The question is modified, via the network, using the user context data to create at least one modified question having at least one additional criteria based on the user context data. A second query is formulated so as to search, via the network, for knowledge data, user profile data, social network data, spatial data, temporal data and topical data that is available via the network and relates to the modified question criteria and the identified user so as to identify knowledge data relevant to the identified user and the modified question criteria. The knowledge data is transmitted, over the network, to the questioning user.

In another embodiment, the invention is a method. A request is received, over a network from a requesting user for at least one suggested question, the question comprising an identification of a user. A first query is formulated, so as to so as to search, via the network for knowledge data, user profile data, social network data, spatial data, temporal data and topical data available to the network that relates to the identified user so as to identify knowledge data relevant to the identified user's current context. The identified knowledge data is transmitted, over the network to the requesting user.

In another embodiment, the invention is a system comprising: a user manager that receives questions, over a network, from questioning users, the question comprising an identification of a user and at least one question criteria; a query analyzer manager that, for each question received by the user manager, formulates a query so as to search, via the network, for user profile data, social network data, spatial data, temporal data and topical data that is available via the network and relates to the question criteria and the identified user so as to identify user context data relevant to question criteria, wherein the query analyzer manager modifies the question, using the user context data to create at least one modified question having at least one additional criteria based on the user context data; and a question manager that, for each modified question, formulates a query so as to search, via the network, for knowledge data, user profile data, social network data, spatial data, temporal data and topical data that is available via the network and relates to the modified question criteria and the identified user so as to identify knowledge data relevant to the identified user and the modified question criteria, wherein the identified knowledge data is transmitted by the user manager, via the network, to the questioning user.

In another embodiment, the invention is a system comprising: a user manager that receives requests for at least one suggested question, over a network, from requesting users, the request comprising an identification of a user; and a question manager that, for each request received by the user manager, formulate queries so as to search, via the network for knowledge data, user profile data, social network data, spatial data, temporal data and topical data available to the network that relates to the identified user so as to identify knowledge data relevant to the identified user's current context, wherein the user manager transmits, over the network, the identified knowledge data to the requesting user.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
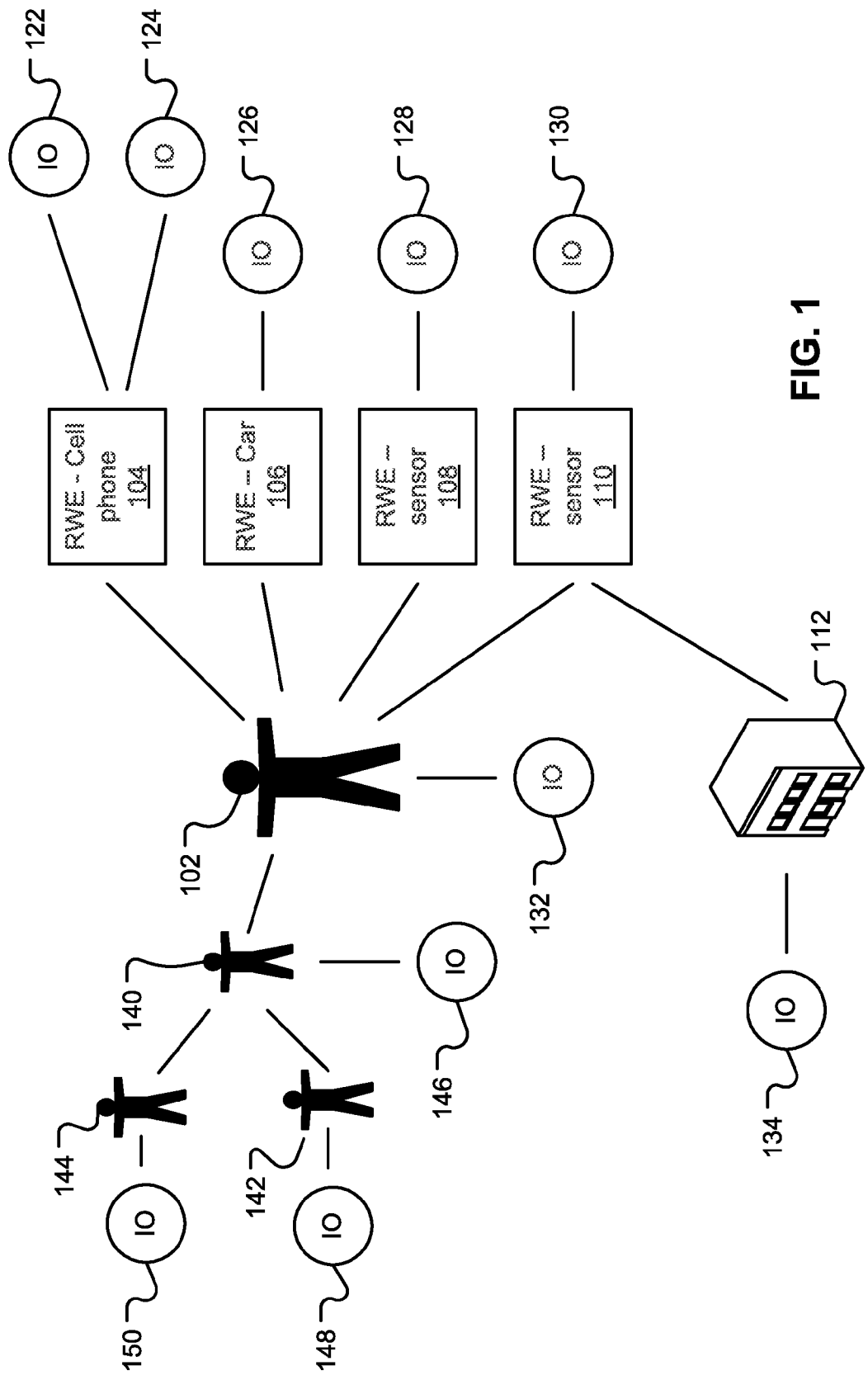
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a genrel purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium stores computer data in machine readable form. By way of example, and not limitation, a computer readable medium can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid-state memory technology, CD-ROM, DVD, or other optical storage, magnetic cassettes, magnetic tape, magnetic disk storage or other mass storage devices, or any other medium which can be used to store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWEs on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
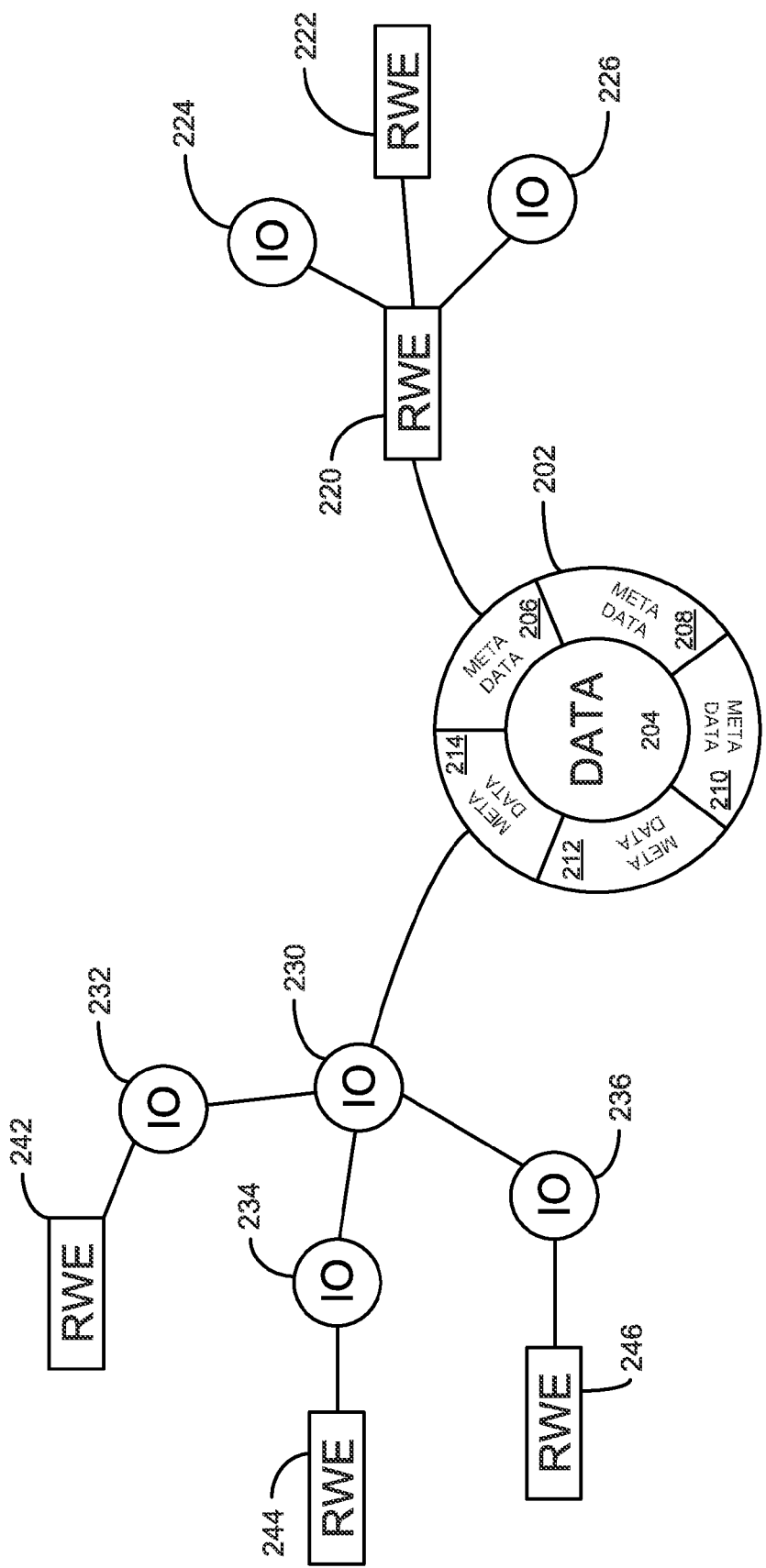
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
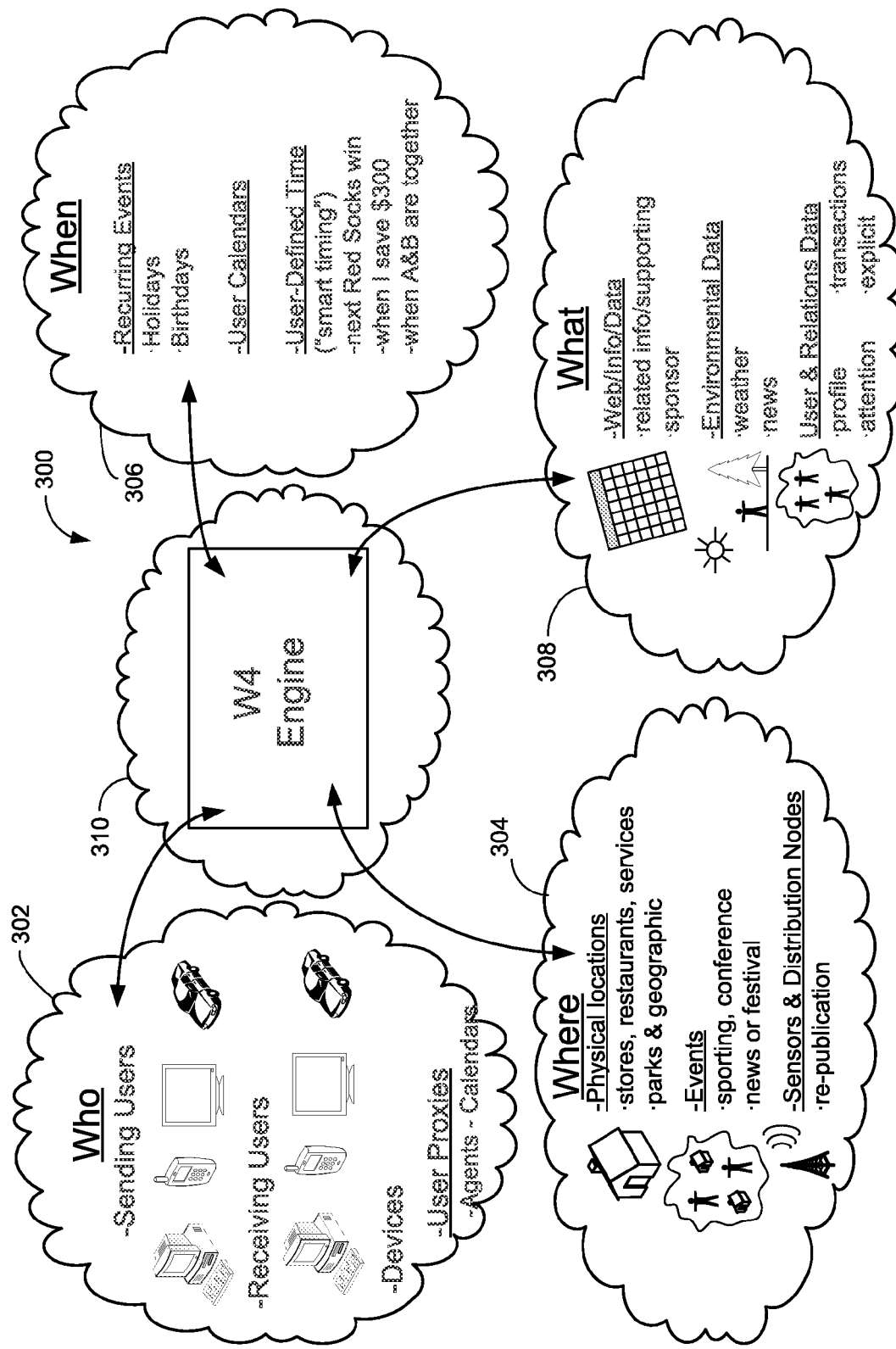
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
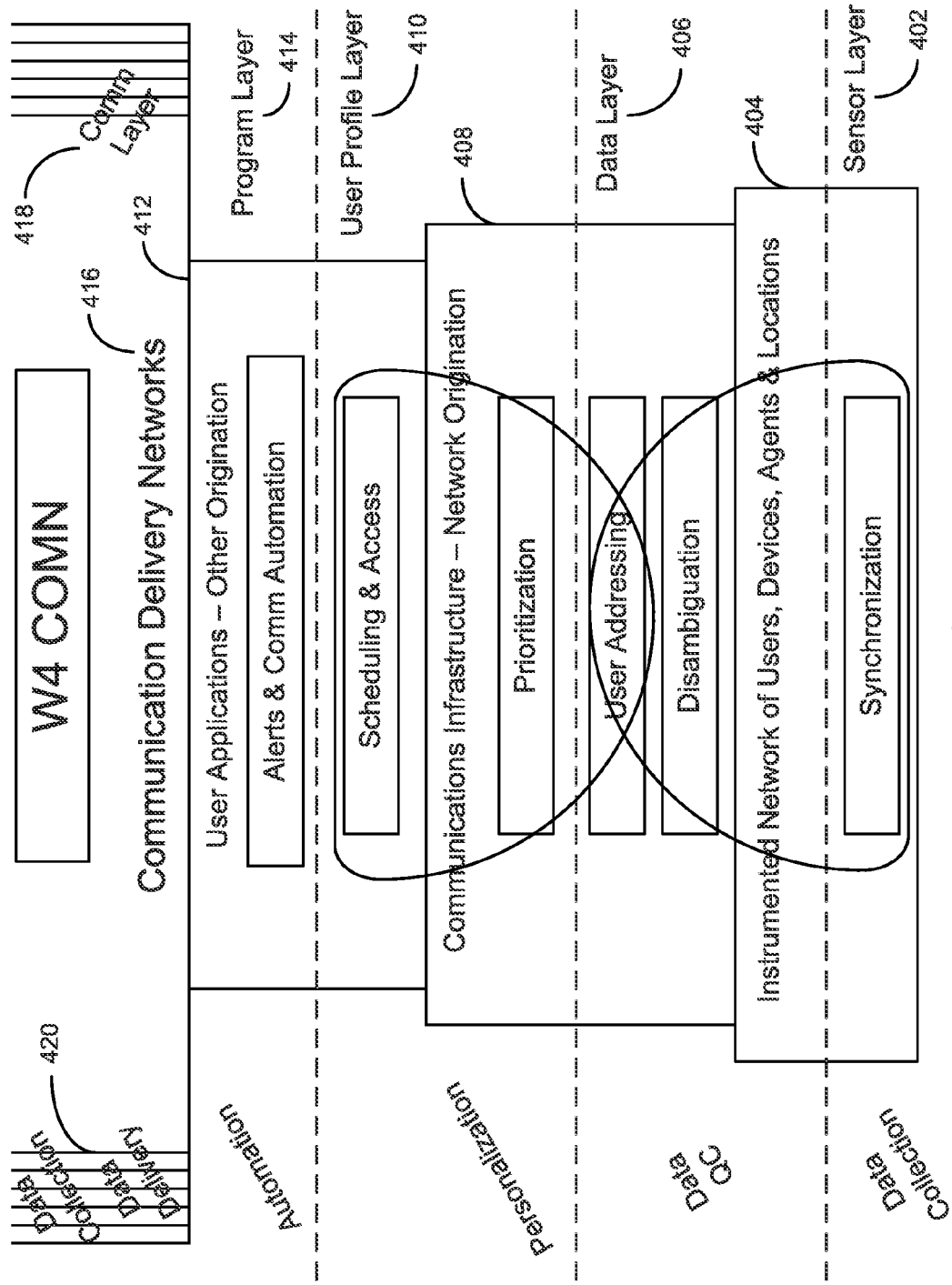
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photo-blogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to analyzed and increased in weighting prioritization decisions in the personalization/user profiling layer 410.

Figure 5:
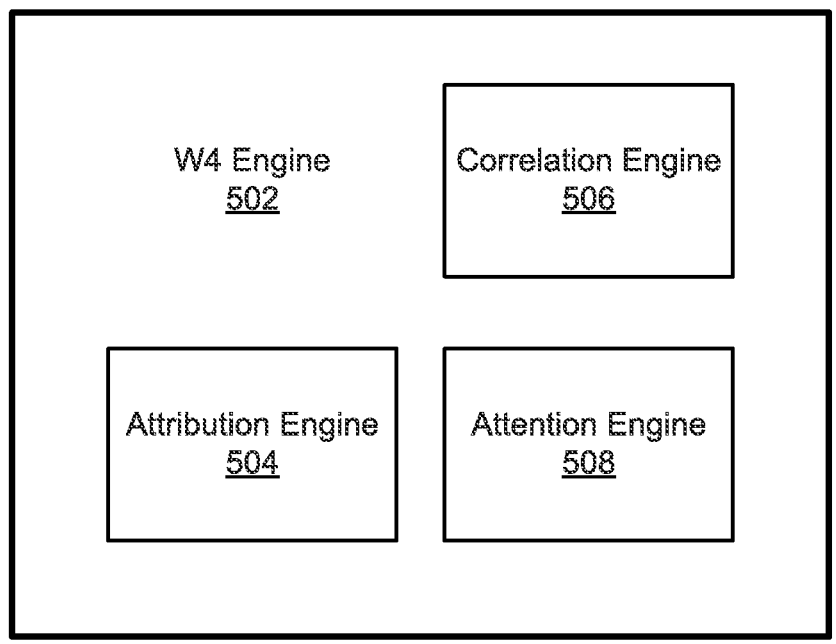
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
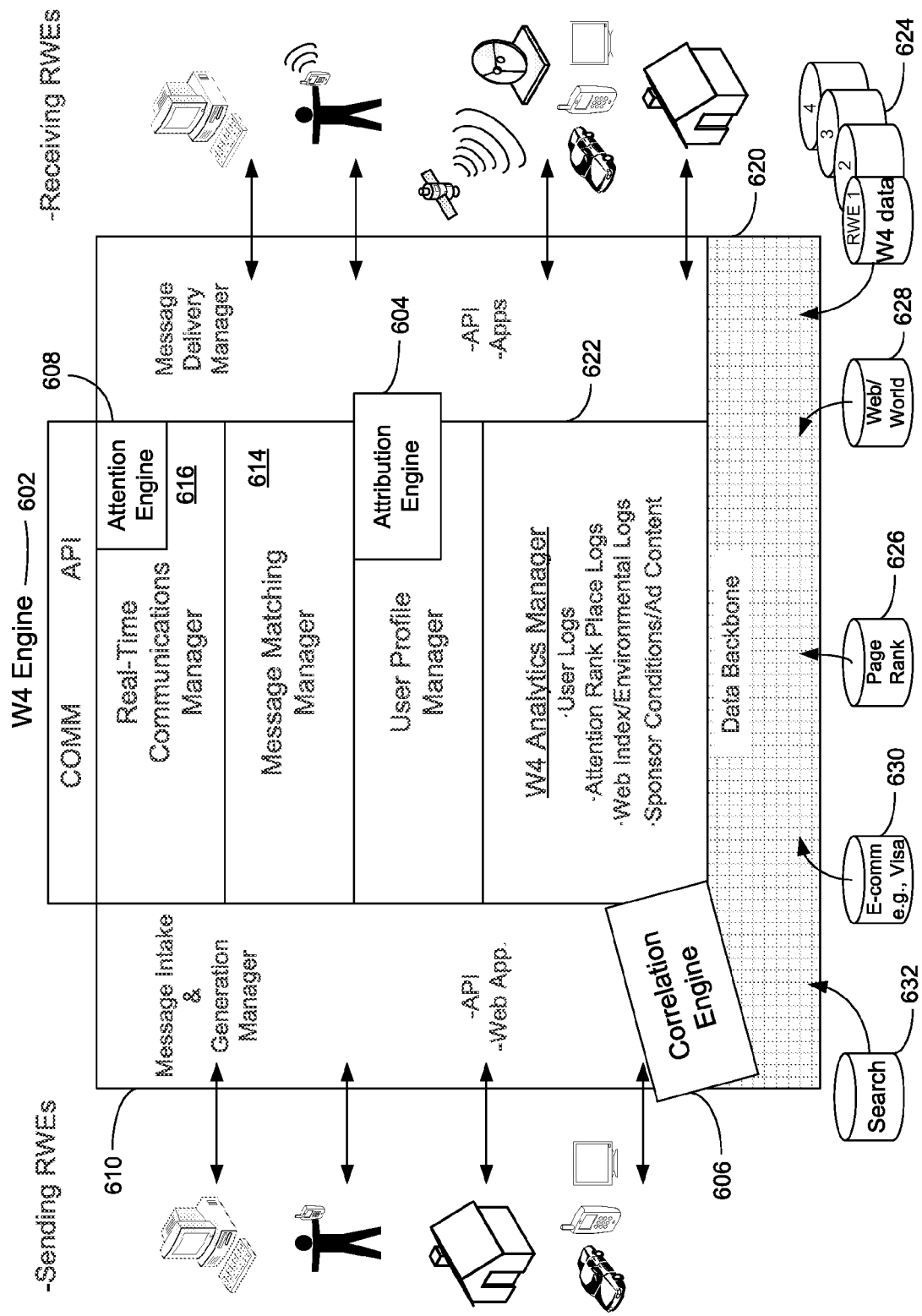
FIG. 6 illustrates one embodiment of a W4 engine showing different components within the sub-engines shown in FIG. 5.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
|---|---|---|
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device interactions |
| User input of location | | |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Context Based Query Augmentation

One of the most popular information services used on the Internet are knowledge search services such as Yahoo! Answers. Such services allow users to post questions and receive answers from a broad base of other users, some of whom may be subject matter experts, some of whom may have had similar life experiences and some of whom have an interest in the subject matter of the question. Over time, a wide array of questions and answers are accumulated and together form a knowledge base that can be indexed and searched. Searching such knowledge bases can carry significant advantages over searching the web for content matching keywords, since oftentimes such as search can provide precise and targeted answers to specific questions.

The potential value of such a knowledge base grows with every question posed and answer given, but the difficulty in using the knowledge base grows as well. A user may have difficulty translating a general question into a form that yields a manageable set of questions and answers. There simply be too many questions and answers to browse manually. A keyword search of a knowledge base may yield no answers at all or answers that are marginally relevant to the user.

Users of knowledge search services commonly ask questions that relate, in one way or another, to their current context. A user's context can be broadly defined as the total set of circumstances that surround a user at any point in time. A user's context includes the user's current location, the date and the time, but can also include any other spatial, temporal, social and topical data that define who the user is and where the user has been, where the user is going, with whom are they going for what purpose and what is the user interested in.

For example, a user might ask, "where's a good place to eat?" Obviously, any answers referring to restaurants that are not reasonably close to the user are not useful. Thus, if the user is currently in Santa Fe, the question is actually "where's a good place to eat in Santa Fe?" But the user might have food preferences, for example, the user might like sushi or That, so the question is actually "where's a good sushi or That restaurant in Santa Fe?" At an even more abstract level, if its past 12:00 PM, and a user hasn't had lunch, it might be obvious that the next question is "where's lunch?", unless, of course, the user always skips lunch. Users may also prefer to hear the opinion of people who are similar to them, e.g. same age, same profession, and so forth.

A W4 COMN, or a similar network that tracks Who, What, When and Where data can mine data accumulated about users to enhance searching a knowledge base, or any other kind of database that contains information about people, places, things, events or topic to augment questions posed by a user. Furthermore, over time, questions asked by specific users in specific contexts can be archived and used to form predictive models that can be used to predict questions that a user having specific attributes is likely to ask in specific situations.

For example, suppose a user has been on a long-distance train ride, has been stationary in his or her seat for 2.5 hours and has used a credit card to buy four beers during that time from the train's mobile snack vendor. As the user exits the train, the user pulls out a PDA to make a query, and the device automatically pops up a map of the station with the nearest bathrooms already indicated on the map. The user might select a "not this" button and the next likely answer is displayed, e.g. the currency exchanges and/or checked baggage claim and or taxi stands. Each individual might receive a differently constituted or ranked set of most likely answers to their current situation, e.g. if a user's path history shows that the user never uses train station bathrooms, it might display taxis or the nearest hotel or fast food bathroom depending on my individual data history and profile. In another automatic embodiment, perhaps sponsored by an advertiser, a user who has a history of buying souvenirs at concerts would have his device display the location of memorabilia vendors at the venue.

Figure 7:
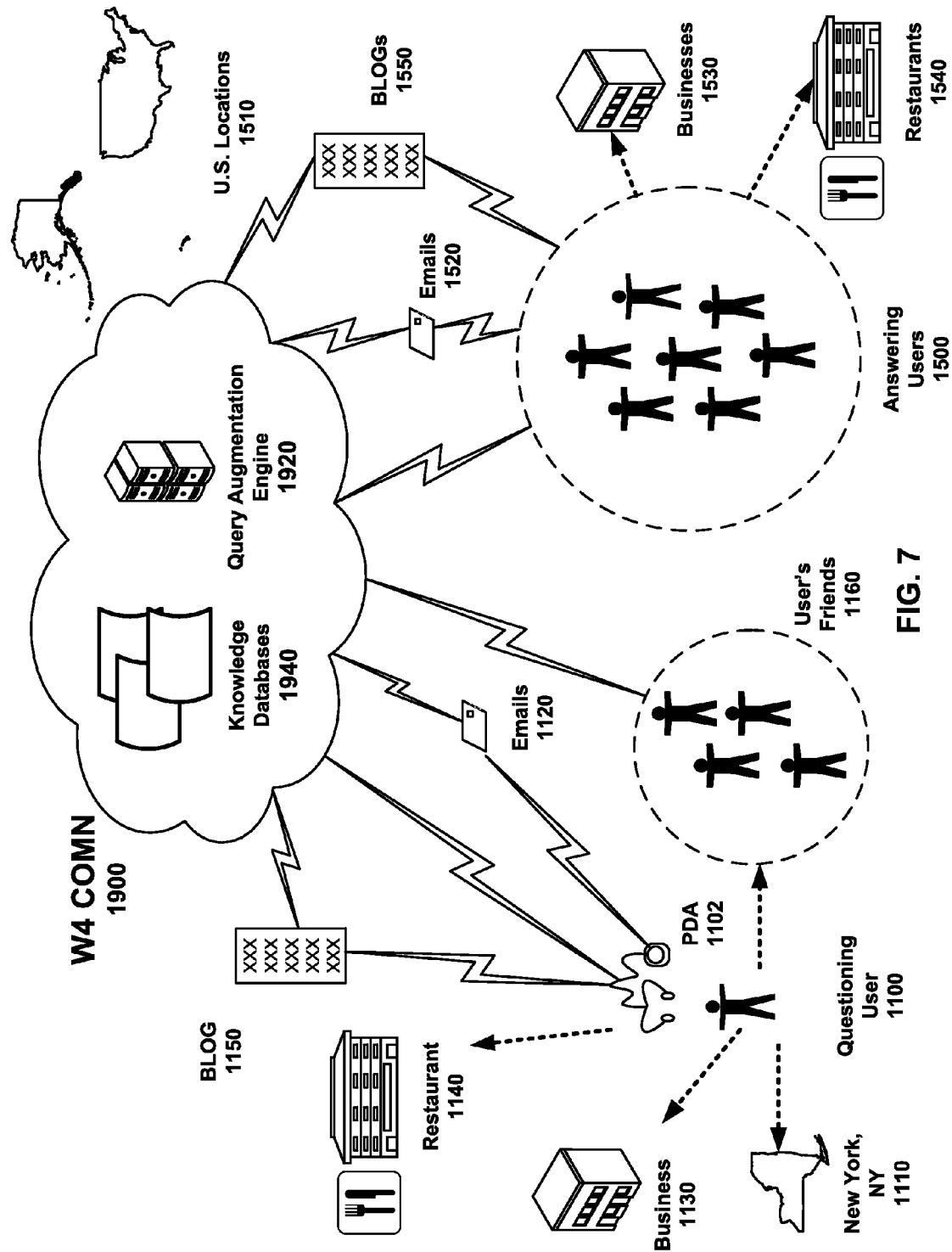
FIG. 7 illustrates one embodiment of a how a W4 COMN can provide context enhanced knowledge search services.

FIG. 7 illustrates one embodiment of a how a W4 COMN can provide context enhanced knowledge search services.

The W4 COMN 1900 maintains one or more knowledge databases 1940 that contains questions posed by questioning users 1100 and answers given by answering users 1500 (i.e. a Q&A database.) Access to the knowledge database 1940 is provided by a query augmentation engine 1920. A questioning user 1100 can submit a question to the query augmentation engine 1920 through a proxy device, such as a PDA 1102 and receive one or more answers to the question through the proxy device.

The questioning user 1110 is currently located in New York City, is a customer of a business 1130 and is currently dining at a restaurant 1140. The questioning user 1100 additionally maintains a BLOG 1150, has an email account 1120 and has a group of friends. All of these entities and data objects, as well as their association to the questioning user 1100, are known to the W4 COMN 1900 and help define the user's current context. The user's current context can be broadly defined as the total set of social, topical, temporal and spatial information that locates the user in space and time and identifies the user's interests, activities and social associations.

Each answer in the Q&A database 1940 is provided by an answering user 1500. Each answering user 1500 has his or her own context as well. For example, each of the answering users 1500 is located somewhere in the U.S. 1510, is a customer of one or more businesses 1530, dines at one or more restaurants 1540, has at least one email account 1520, and maintains at least one BLOG 1550. All of these entities and data objects, as well as their association to the answering users 1500, are known to the W4 COMN 1900 and help define the answering users' current contexts.

The query augmentation engine 1920 can mine the social, topical, temporal and spatial information relating to a questioning user's current context to supplement questions asked by the user. Thus, for example, if the questioning user 1100 asks "where should I eat?", the query augmentation engine 1920 could determine that it is lunchtime, that the user is in New York City 1110 and that the user has dined frequently at a sushi restaurant 1140, and thus compose a more specific question "where is a sushi restaurant in New York City that is open for lunch?"

The query augmentation engine 1920 can additionally mine the social, topical, temporal and spatial information relating to answering users' current contexts to help refine the set of answers returned to the question. For example, in response to the question "where is a sushi restaurant in New York City that is open for lunch?", the query augmentation engine 1920 could preferentially select answers given by the questioning user's friends 1160, could preferentially select answers by users who are residents of New York City, who are demographically similar to the questioning user (e.g. same age, income level, same interests), and so forth.

The W4 COMN 1900 can additionally store historical context information relating to each question and answer. For example, the questioning user 1110 might live most of the year in Hawaii, but is on vacation in New York City when the question "where should I eat?" is asked. The historical context for the question will contain a specific spatial location, New York City. An answering user 1500 may now be in a high income bracket, but may have been at a low income level when he or she answered the question. The historical context for the question will contain a specific demographic, low income level.

Over time, the Q&A databases 1940 can accumulate a large repository of questions and answers relating to a wide array of contexts. The query augmentation engine 1920 can tap into this information to suggest questions even when none are asked. For example, if users on vacation in New York City who like sushi frequently ask the question "where should I eat?" around 12:00 PM, the query augmentation engine 1920 can detect when a user is in such a context and suggest such a question spontaneously to the user.

Figure 8:
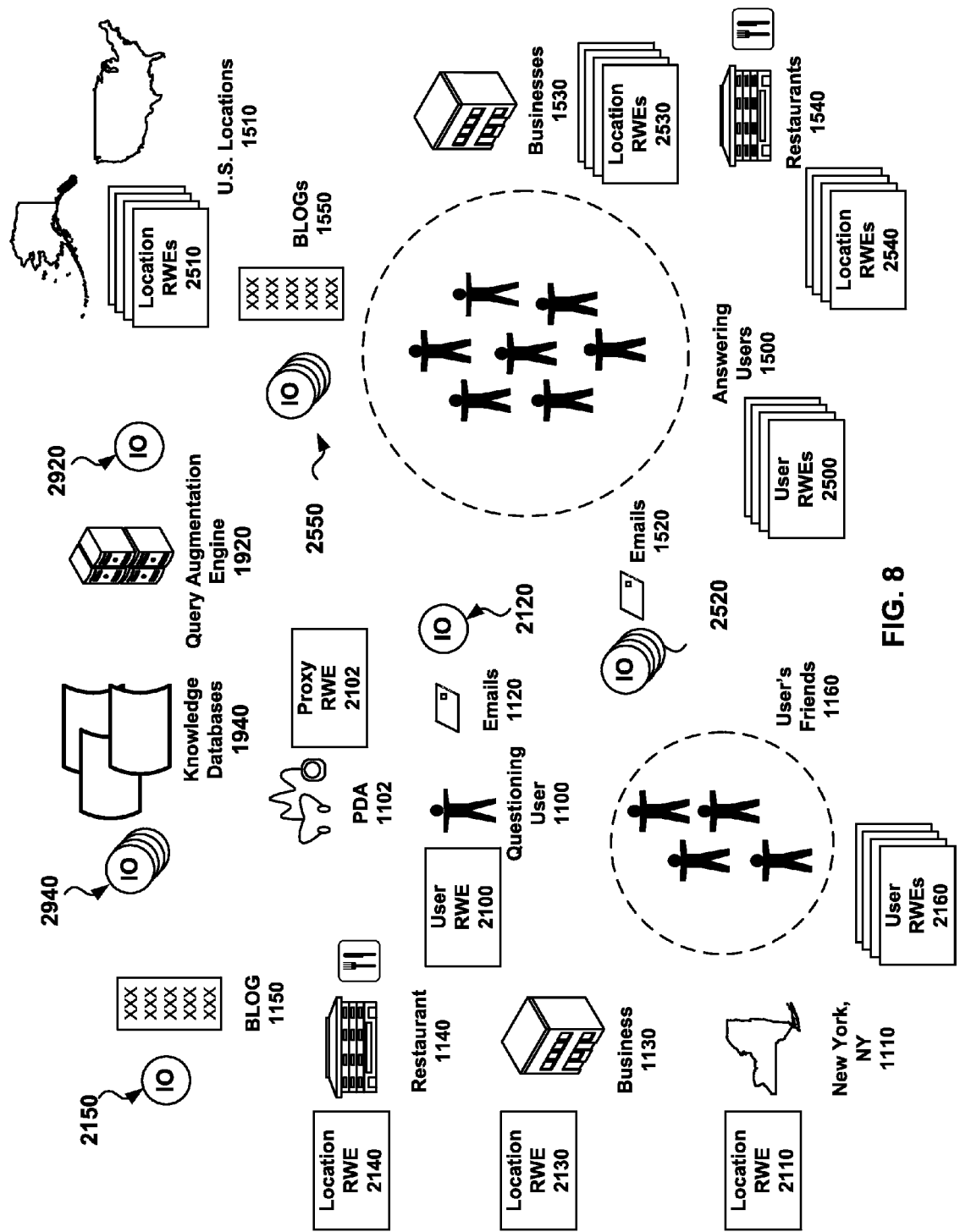
FIG. 8 illustrates one embodiment of how the users, devices and associated data objects shown in FIG. 7 can be defined to a W4 COMN.

FIG. 8 illustrates one embodiment of how the users, devices and associated data objects shown in FIG. 7 can be defined to a W4 COMN.

Figure 9:
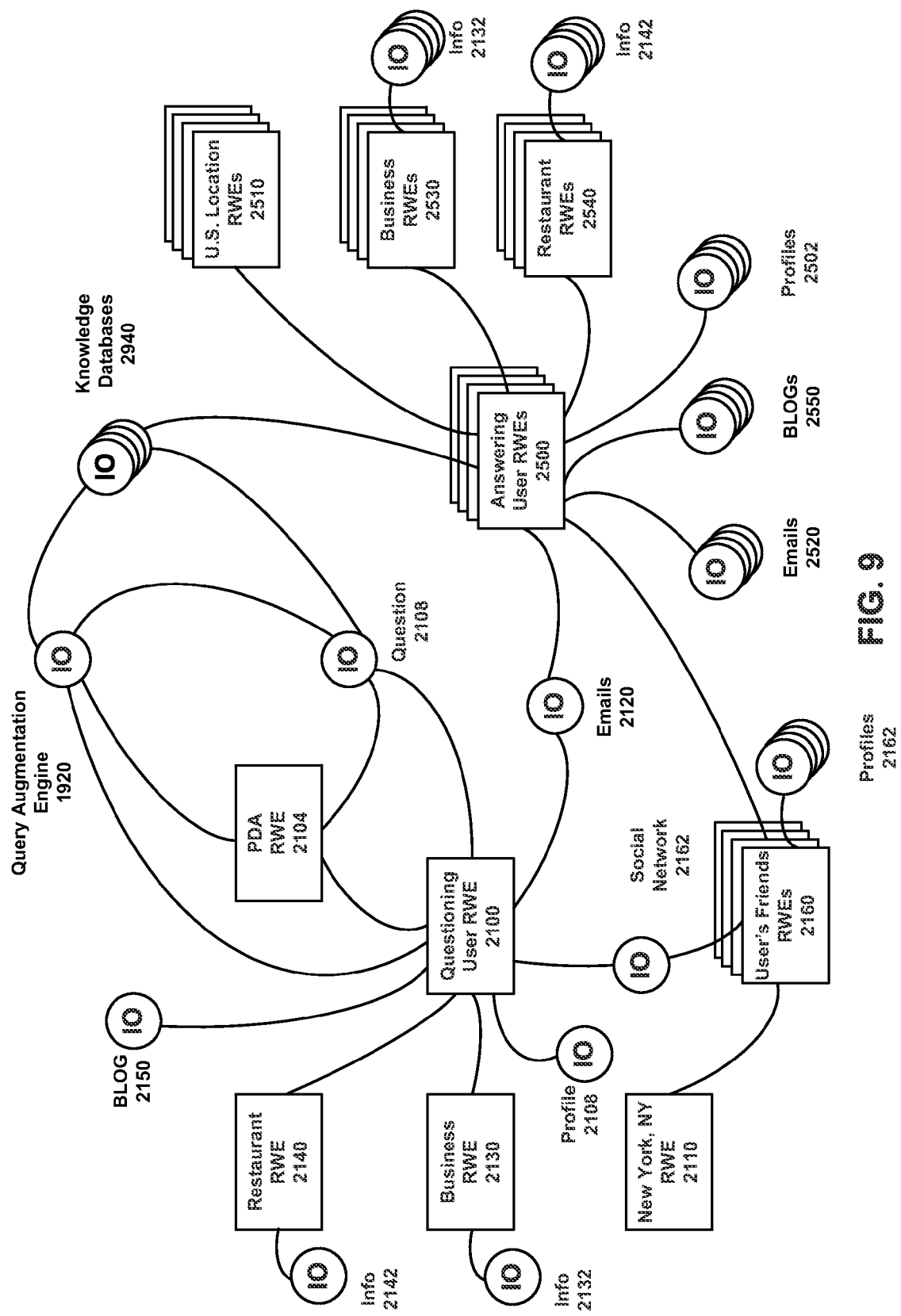
FIG. 9 illustrates one embodiment of a data model showing how the RWEs and IOs shown in FIG. 8 can be related a users question within a W4 COMN.

Users 1110 and 1500 are represented as user RWEs, 2110 and 2500 respectively. The questioning user's PDA 1102 is represented as a proxy RWE 2102. Businesses 1130 and 1150 are represented as location RWEs 2130 and 2150 respectively. Restaurants 1140 and 1540 are represented as a location RWEs 2140 and 2540 respectively. New York City and other U.S. locations 1110 and 1510 are represented as a location RWEs 2110 and 2510 respectively. User emails 1120 and 1520 are represented as passive data IOs 2120 and 2520 respectively. User BLOGS 1150 and 1550 are represented as passive data IOs 2150 and 2550 respectively. The query augmentation engine 1920 and the knowledge databases 1940 are represented as active IOs 2920 and 2940 respectively FIG. 9 illustrates one embodiment of a data model showing how the RWEs and IOs shown in FIG. 8 can be related a users question within a W4 COMN.

In one embodiment, the submission of a question by a questioning user using a proxy device creates a passive question IO 2108 associated with the questioning user RWE 2100, the user's PDA proxy RWE 2104 and the query augmentation engine IO 2920. The questioning user RWE 2100 is directly associated with a user profile IO 2108. In one embodiment, the user profile IO 2108 is a consolidated profile that relates the user to all personal and demographic data available to the network relating to the user.

The questioning user RWE 2100 is currently associated with a location RWE for New York City because the user is physically present in New York City. The network may have detected the user's current location through, for example, the user's PDA using an embedded GPS device or by triangulation of cellular signals broadcast by the device. The questioning user RWE 2100 is further directly associated with an RWE for a business 2130 that the user patronizes, which itself has at least one IO 2132 containing information about the business such as the type of the business, ownership information and hours of operation. The questioning user RWE 2100 is further directly associated with an RWE for a restaurant 2140 that the user patronizes, which itself has at least one IO 2142 containing information about the business such as menus, reviews and hours of operation.

The questioning user RWE 2100 is further directly associated with IOs for emails 2120 sent and received by the questioning user and a BLOG 2150 maintained by the user. The questioning user RWE 2100 indirectly associated with a group of user RWEs 2160 representing the user's friends though a social network IO 2162, which could be a passive data IO, such as a contact list, or could be an active IO, such as a social networking website provided by a third party provider. Each of the user RWEs 2160 has at least one profile IO containing, for example, demographic information about each user.

The data relationships in the illustrated embodiment discussed above are exemplary, and do not exhaust the myriad number of entities and IOs that can be directly or indirectly related to the questioning user RWE 2100. The questioning user RWE 2100 can be indirectly related to a large, and potentially unbounded set of entities and data known to the network through various data relationships and at varying degrees of separation. For example, the user's friends 2160 each may patronize different businesses and restaurants, maintain their own BLOGs, be in a different physical location at any point in time, and so forth. The total set of RWEs and IOs directly or indirectly related to the questioning user RWE 2100 provide a detailed picture of the user's current and historical contexts that can be used to augment questions posed by a user within that context.

Similarly, each answering user RWE 2500 is associated, directly or indirectly, with a potentially unbounded set of RWEs and IOs through a network of data relationships. In the illustrated embodiment, each answering user RWE 2500 is directly associated with RWEs for businesses and restaurants 2530 and 2540 patronized by the users and RWEs representing the current location 2510 of the users. Each answering user RWE 2500 is further directly associated with IOs representing user emails 2520, user BLOGs 2550 and user profiles 2502. The RWEs for businesses and restaurants 2530 and 2540 each are associated with IOs 2532 and 2542 for information relating to the business and restaurant respectively. The total set of RWEs and IOs directly or indirectly related to the answering user RWEs 2500 provide a detailed picture of the answering user's current and historical contexts that can be used to select users whose answers are most likely to be helpful or of interest to the questioning user.

There can also be relationships between a questioning user RWE and answering user RWEs. Such relationships may arise through similar interests, common friends, common physical locations, common online browsing, community or communications and so forth. In the illustrated embodiment, at least one of the RWEs 2160 for the questioning user's friends is an answering user RWE 2500 and at least one of the questioning users emails 2120 is associated with an answering user RWE, for example, because the email is directed to, or refers to, the answering user the RWE relates to.

In one embodiment, within a W4 COMN, the relationships shown in FIG. 9 are built and maintained by one or more correlation engines within a W4 engine which services the W4 COMN. The creation of such relationships may be automatic and part of the normal operation of the W4 COMN. Alternatively, such relationships can be created on demand.

In one embodiment, questions 2108 that are being posted for the first time are inserted into the knowledge database 2940 and can be responded to by answering users. In one embodiment, every question inserted into the knowledge database 2940 is associated with the context of the questioning user at the time the question was posed. In one embodiment, questions in the knowledge database 2940 which have been asked multiple times by various users are associated with the contexts of all, or substantially all, of the questioning users at the time the question was posed. In one embodiment, every answer inserted into the knowledge database 2940 is associated with the context of the answering user at the time the answer was given.

In one embodiment, the query augmentation engine 2920 can automatically create a question IO 2108 by examining the current context of a user RWE 2100 and matching the user's context to contexts for questions stored in the knowledge database 2940. The IO 2108 can then be sent to the user's proxy device 2104 as a suggested question.

Figure 10:
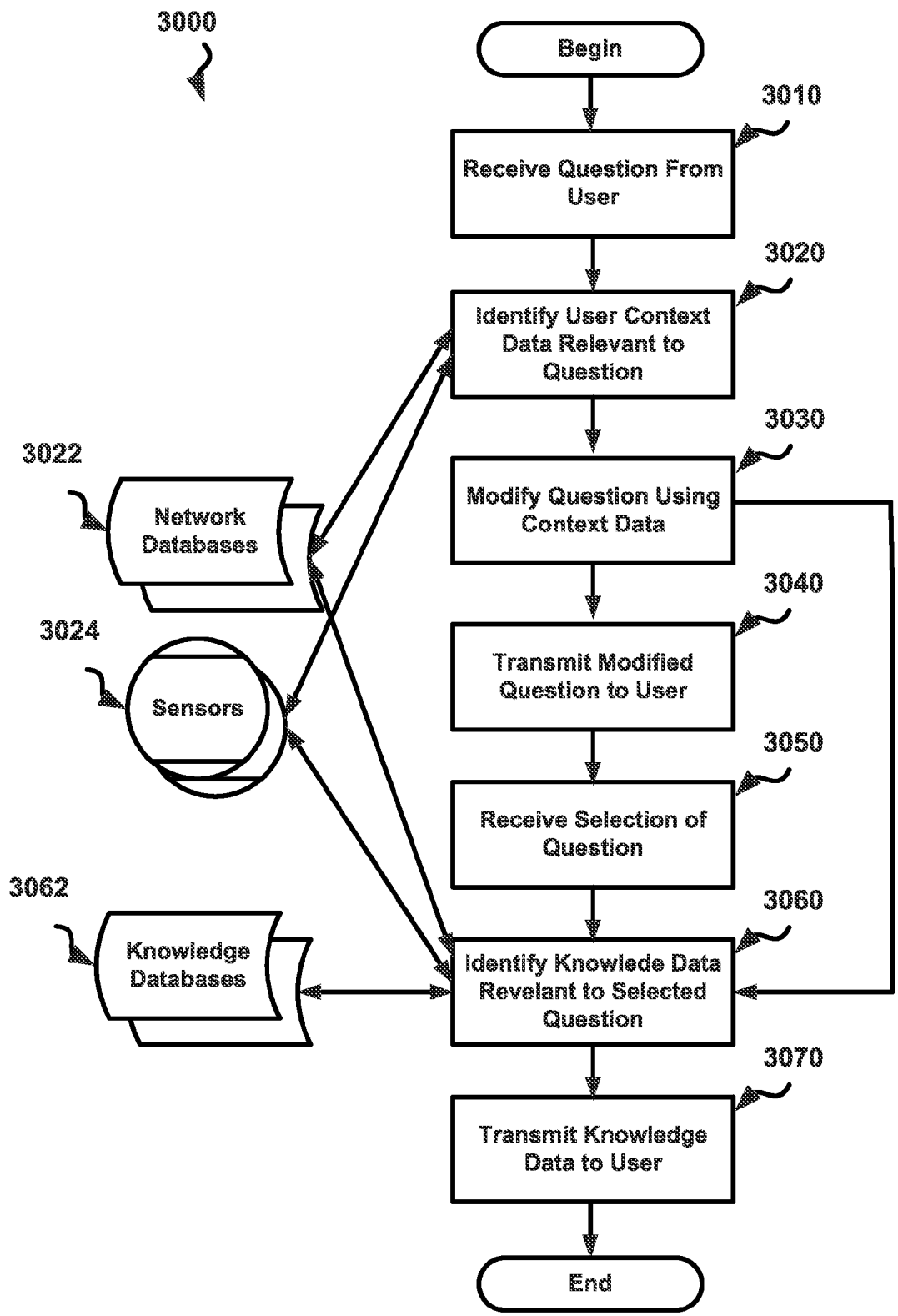
FIG. 10 illustrates one embodiment of a process of how a network, for example, a W4 COMN, can use temporal, spatial, and social data relating to a user to provide augmented queries for a knowledge system.

FIG. 10 illustrates one embodiment of a process 3000 of how a network, for example, a W4 COMN, can use temporal, spatial, and social data relating to a user to provide augmented queries for a knowledge system.

A question is received 3010, over a network, from a questioning user relating to any topic of interest to the user. The question comprises, at a minimum, an identification of a user and at least one question criteria. The identification of a user can be, without limitation, a name, a login, an email address, a certified introduction from a trusted source or any other token or set of tokens that uniquely identifies a user within the network. The identification could comprise a user ID on a social networking website. In one embodiment, the identification of a user refers to the questioning user. In one embodiment, the identification of the user can refer to a second user (i.e. other than the questioning user.)

Question criteria can, without limitation, comprise any spatial, temporal, topical or social criteria relating to real world entities and topics of interest. In one embodiment, the criteria can be related to one another using standard relational or set operators. In one embodiment, the question can be stated as a natural language query. In one embodiment, the question can be stated as a media object such as a photo or video or audio clip. In one embodiment, query criteria are tokens formed with standard characters such as words or symbols.

In one embodiment, query criteria can include data objects. For example, a user could enter the query such as "what is this?<image>", "show me more like this<image>", or "who wrote the lyrics to this?<media>" where <image> and <media> represent actual image and media data objects the user attaches to the question. In one embodiment, questioning user can submit an image or video clip in real-time, for example, of a co-located building or object. The process can then automatically format a question to gather a set of similar multimedia content labeled with the name, function, known information related to the building/object.

The identification of a user and the question criteria are then 3020 used to formulate a first query so as to search, via the network, for user profile data, social network data, spatial data, temporal data and topical data that is available via the network (including network databases 3022 and sensors 3024) that relates to the question criteria and the identified user so as to identify user context data relevant to question criteria. In formulating the query, if a data object is included in among the question criteria, the data object can be processed to help further define the object by, without limitation, extracting keywords from the object content, extracting metadata from the object, classifying the object using an image classifier, deriving a checksum, or deriving a signature from the object.

The user context data is then used, via processing capabilities available to the network, to add additional criteria to the original question 3030 to create a modified question qualified with user context data. The additional criteria can be any kind of spatial, temporal, social or topical criteria that qualify, personalize and refine the original question so as to form a more specific and targeted question. In one embodiment, the original question criteria and the additional question criteria are formed into multiple questions that can range in specificity or relate to alternative topics.

Optionally, the modified question or questions can be transmitted to the user 3040, via the network, so as to allow the user to select specific modified questions for further processing. After the user completes his or her selection, the user's selection is received over the network 3050 and only selected questions are processed.

The identification of a user and modified question criteria are then used to formulate a second query 3060 so as to search, via the network, for knowledge data, user profile data, social network data, spatial data, temporal data and topical data available to the network (including network databases 3022 and sensors 3024 and knowledge databases 3062) that relates to the modified question criteria and the identified user so as to identify knowledge data relevant to the identified user and the modified question criteria. The identified knowledge data retrieved by the second query can be an exact match to the modified question criteria, or can be a close fit. For example, the question "where's a good sushi or That restaurant in Santa Fe?" could retrieve a related question "where's a good seafood restaurant in Santa Fe?" or "where's a good Japanese restaurant in the Santa Fe area?"

In one embodiment, knowledge data comprises questions and answers entered by a plurality of users. In one embodiment, the knowledge data additionally comprises an identification of each of the plurality of users who entered the questions and answers. In one embodiment, the knowledge data additionally comprises spatial, temporal, social and topical data that related to each of the plurality of users who entered the questions and answers at the time such questions and answers were entered (that is to say, the context of the users at the time the questions and answers were entered.)

In one embodiment, the knowledge data for each question and answer additionally comprises an identification of at least one of a plurality of users who have consumed the knowledge data (e.g. any users who have viewed the knowledge data.) In one embodiment, the knowledge data additionally comprises spatial, temporal, social and topical data that related to each of the plurality of users who consumed the knowledge data at the time the data was consumed (e.g., the context of the users viewing the knowledge data at the time the knowledge data was viewed.)

In one embodiment, the knowledge data additionally comprises a selection of a best answer, wherein the user who originally entered the question has selected a best answer from among the answers posted. In one embodiment, the knowledge data for at least some questions and answers additionally comprises consumption popularity data (e.g. the number of times a question or answer was selected or viewed.) In one embodiment, the knowledge data for at least some questions and answers additionally comprises annotations which, in one embodiment, can be entered by any user of the system. In one embodiment, the knowledge data for at least some answers additionally comprises ratings of the answer's usefulness by users, which can be entered by the questioning user or by consuming users.

In one embodiment, the identified knowledge data is ranked based on the closeness of fit between the modified question criteria and the identified knowledge data. In one embodiment, the identified knowledge data is ranked based on the closeness of fit between the context of the identified user and the current or historical context of the users who entered the knowledge data relating to the user's questions. In another embodiment, the identified knowledge data can be ranked based on the closeness of fit between the context of the identified user and the current or historical context of the users who discovered, browsed or interacted with the knowledge data relating to the user's questions, e.g. as search results to a similar or identical query or context. The selected knowledge data is then transmitted 3070 to the end user. Data transmitted to questioning users can be formatted in any electronic format suitable for consumption or display by a user device such as, for example, HTML or XML documents.

In one embodiment, if no knowledge data is a close fit to the modified question, the modified question, the original question or both are posted to the knowledge databases 3062 such that other users can view the questions and post answers.

Figure 11:
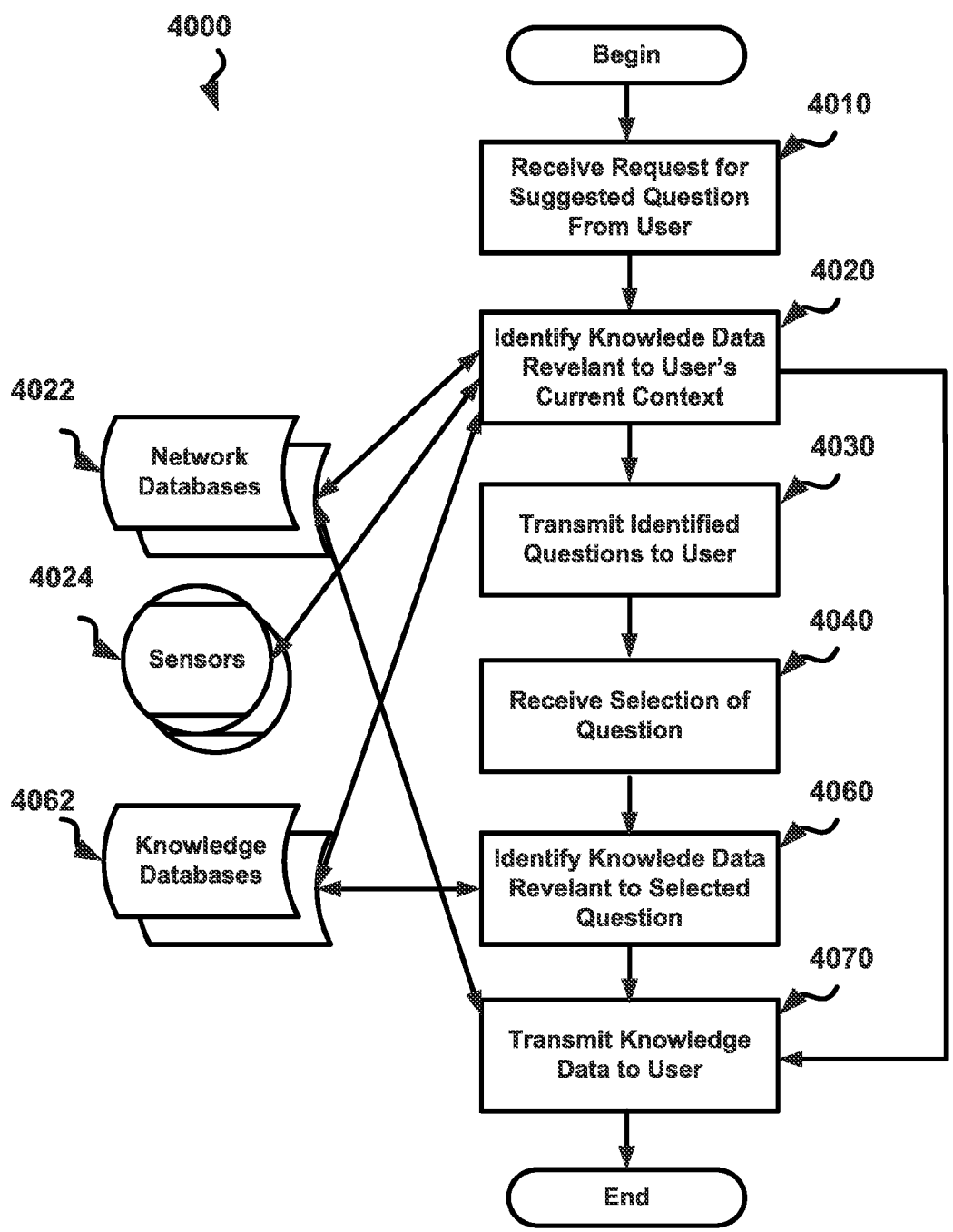
FIG. 11 illustrates one embodiment of a process of how a network, for example, a W4 COMN, can use temporal, spatial, and social data relating to a user to provide automatically generated context sensitive queries.

FIG. 11 illustrates one embodiment of a process 4000 of how a network, for example, a W4 COMN, can use temporal, spatial, and social data relating to a user to provide automatically generated context sensitive queries.

As part of the normal operation of a W4 COMN, the current context of users is constantly updated. Spatial, temporal, topical and social data is tracked, correlated and indexed for individual users from a panoply of sources. The W4 COMN can, if a user carries a geo-locatable proxy device, track the user's location in real time. The W4 COMN can infer activities that a user engages in by extracting interaction data from a variety of sources such as emails, text messages and so forth. The W4 COMN can also be aware of a person's preferences, aversions, hobbies, social circle and so forth. Every instant, a user's context, the Who, What, When and Where surrounding a user can change.

Over time, knowledge database is accumulated, users in various contexts will tend to ask similar, or identical questions. The knowledge database can be made context aware by storing the context of the user asking a question at the time the question was asked. Where a question is frequently repeated in a particular context, on an empirical basis, it can be inferred that such a question has particular relevance to users in such a context. Thus, the knowledge database not only accumulates the knowledge of the users using the database, but also effectively indexes questions by context, enabling the system to suggest questions where none are asked.

The process begins when a request for a suggested question or questions is received 4010 over a network from or on behalf of a requesting user. The request could be triggered by a user-initiated event, such as a user taking a user interface action on a proxy device or when a user speaks a keyword or key phrase into a cell phone or PDA. The request could be automatically triggered on behalf of the user by a process within the W4 COMN on a periodic basis, such as every hour. The request could also be automatically triggered on behalf of the user by the W4 COMN or a W4 COMN application based upon sensor or data values on the proxy device beyond a specific threshold so as to initiate a question without user involvement. For example, a proxy device may sense quick de-acceleration over a small distance followed by an impact, and derive that the user has been in some kind of accident, thus triggering a knowledge data request and response.

More generally, a process within the W4 COMN could track multiple spatial, temporal, topical or social variables in a user's current context and trigger a request for a suggested question when any such variables change. For example, the process could trigger a request for a suggested question when a user physically enters a new town, a new city or a new neighborhood, when a user downloads and listens to a new song, when a user sends an email or a text message or when a user meets a friend by chance on the street.

In another example, the trigger event can be a change in the state of a sensor associated with the requesting user. The sensor can be associated with the user's proxy device (e.g. the temperature goes up drastically, so a suggested question might be "what to do in a fire" comes up or accelerometer stops quickly, so "what to do in a crash" comes up, etc.) The sensor could be a network sensor located in proximity to the user (e.g. a traffic or weather sensor.

The request comprises, at a minimum, an identification of a user. The identification of a user can be, without limitation, a name, a login an email address, a certified introduction from a trusted source or any other token or set of tokens that uniquely identifies a user within the network. The identification could comprise a user ID on a social networking website. In one embodiment, the identification of a user refers to the requesting user. In one embodiment, the identification of the user can refer to a second user (i.e. other than the requesting user) who is relevant to the query, e.g. co-located with the requesting user or a preferred filtering source for the requesting user on this subject matter.

In the next step of the process a first query is formulated 4020 so as to search, via the network, for knowledge data, user profile data, social network data, spatial data, temporal data and topical data available to the network (including network databases 3022 and sensors 3024 and knowledge databases 3062) that relates to the identified user so as to identify knowledge data relevant to the identified user's current context. In one embodiment, the identified knowledge data comprises a set of questions and answers entered by a plurality of users which can be transmitted 4070 directly to the user without further processing. In one embodiment, the process identifies the best match question and answer pair and further identifies closely related questions.

In one embodiment the process only identifies questions relevant to the identified user's current context. The identified questions can be transmitted to the requesting user 4030, via the network, so as to allow the requesting user to select specific questions for further processing. After the user completes his or her selections, the user's selection is received over the network 4040 and only selected questions are processed. If the first query did not retrieve answers to the selected questions, the selected questions are used to formulate a second query 4060 so as to search, via the network, for knowledge data, user profile data, social network data, spatial data, temporal data and topical data available to the network that relates to the selected question criteria and the user so as to identify knowledge data relevant to the user and the selected questions.

In one embodiment, the identified knowledge data is ranked based on the closeness of fit between the context of the identified user and the current or historical context of the users who entered the knowledge data relating to the user's questions. The selected knowledge data is then transmitted 4060 to the requesting user. Data transmitted to requesting users can be formatted in any electronic format suitable for consumption or display by a user device such as, for example, HTML or XML documents. In one embodiment, knowledge data returned to a requesting user is filtered using user preferences. For example, a user may choose to filter adult or unwanted topics/subjects, sources, users or any other combination of spatial, temporal, social or topical criteria.

In one embodiment, when a suggested question is selected by a user, the knowledge database is updated to reflect the fact the question has been selected by the user. In one embodiment, the number of times a question has been selected is stored on the knowledge database. In one embodiment, the context of every user that has selected the question is recorded on the knowledge database. In one embodiment, selection count data can be used to rank the identified knowledge data transmitted to the end user. In one embodiment, the identified knowledge data is ranked based on the closeness of fit between the context of the identified user and the current or historical context of the users who have selected the question in the past.

Figure 12:
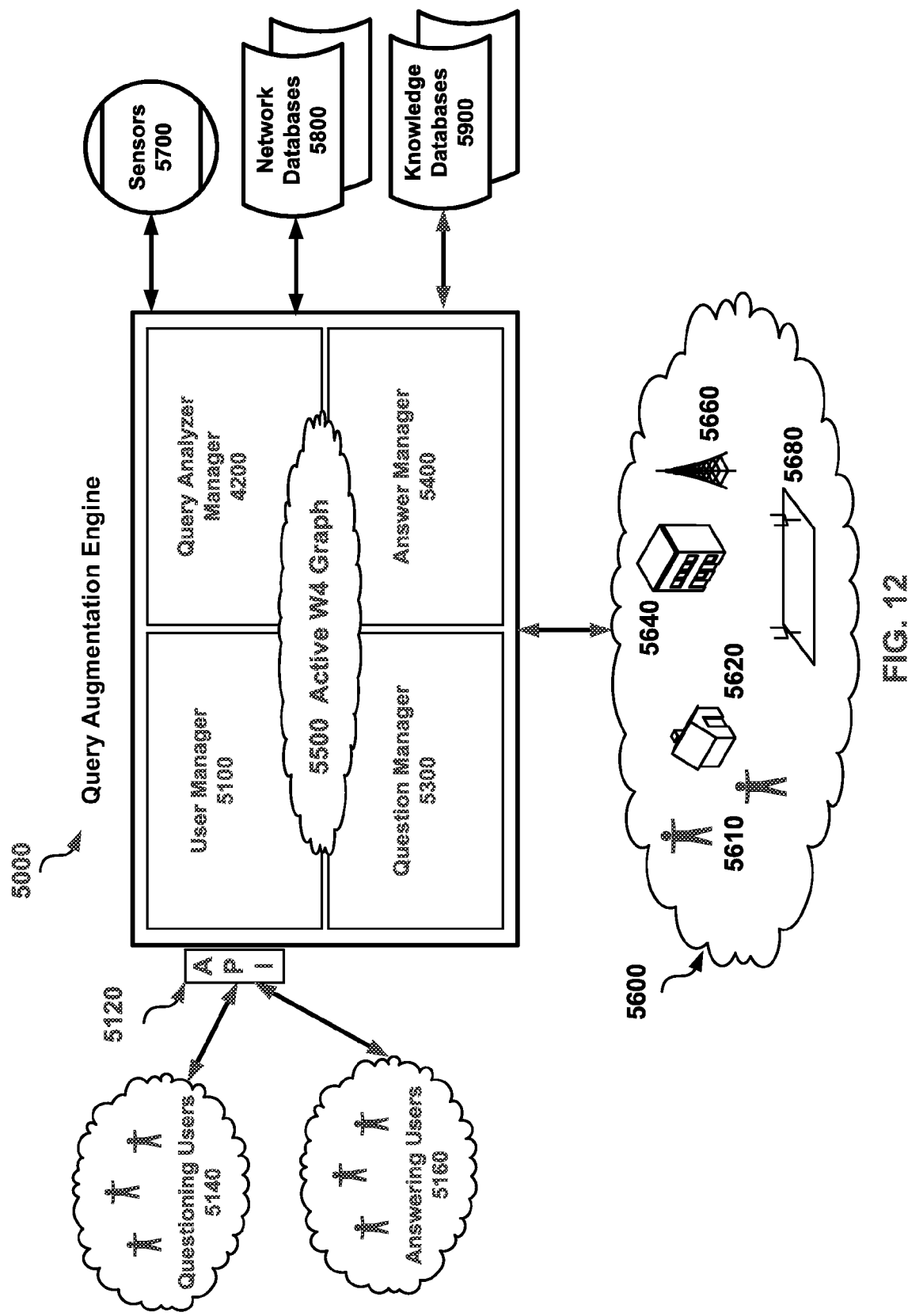
FIG. 12 illustrates one embodiment of an Query Augmentation Engine capable of supporting processes such as that illustrated in FIG. 10 and FIG. 11 that provides query augmentation and automatically generated context sensitive queries within a network, such as a W4 COMN, having temporal, spatial, and social data relating to a users.

FIG. 12 illustrates one embodiment of an Query Augmentation Engine 5000 capable of supporting processes such as that illustrated in FIG. 10 and FIG. 11 that provides query augmentation and automatically generated context sensitive queries within a network, such as a W4 COMN, having temporal, spatial, and social data relating to a users.

The Query Augmentation Engine 5000 comprises four managers, a User Manager 5100, a Query Analyzer Manager 5200, a Question Manager 5300 and an Answer Manager 5400. In one embodiment, the Query Augmentation Engine 5000 is a component of a W4 COMN. In another embodiment, the Query Augmentation Engine 5000 resides on one or more servers and is connected to a network that has access to spatial, social, temporal and topical data relating to a plurality of users. In one embodiment, each of the managers 5100, 5200, 5300 and 5400 are comprised of one or more modules, some of which can be shared between one or more managers. One or more of such modules may be components of other engines within a W4 COMN.

The Query Augmentation Engine 5000 is accessible, via the W4 COMN, to users entering questions 5140 and answering questions 5160. The users 5140 and 5160 are shown inside of clouds indicating that each user asks or answers questions from within a cloud of spatial, temporal, topical and social data associations—the user's current context. Knowledge data is stored in one or more knowledge databases 5900 accessible via the network.

In one embodiment, the W4 COMN continuously gathers spatial, temporal, social and topical data relating to entities known to the network 5600, which can include persons 5610, locations 5620, businesses 5640, sensors 5660, and events 5680. In one embodiment, using spatial, temporal, social and topical data available about a specific user, topic or logical data object every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN. In one embodiment, W4 data and the global index are stored on one or more databases accessible to the network 5800.

The User Manager 5100 provides facilities that allow end users to access the services of the Query Augmentation Engine 5000. The User Manager 5100 is configured to receive questions from questioning users 5140, over a network, relating to any topic of interest to the users. The questions each comprise, at a minimum, an identification of a user and at least one question criteria. The identification of a user can be, without limitation, a name, a login an email address, a certified introduction from a trusted source or any other token or set of tokens that uniquely identifies a user within the network. The identification could comprise a user ID on a social networking website. In one embodiment, the identification of a user refers to the questioning user. In one embodiment, the identification of the user can refer to a second user (i.e. other than the questioning user.)

Question criteria can, without limitation, comprise any spatial, temporal, topical or social criteria relating to real world entities and topics of interest. In one embodiment, In one embodiment, the criteria can be related to one another using standard relational or set operators. In one embodiment, the question can be stated as a natural language query. In one embodiment, the question can be stated as a media object such as a photo or video or audio clip. In one embodiment, query criteria are tokens formed with standard characters such as words or symbols.

In one embodiment, query criteria can include data objects. For example, a user could enter the query such as "what is this?<image>", "where can I find one of these?<image>", or "who wrote the lyrics to this?<media>" where <image> and <media> represent actual image and media data objects the user attaches to the question. In one embodiment, the User Manager is configured to allow questioning users to submit images or video clips in real-time of a co-located building or object. The User Manager can then automatically format a question to return to the user a set of similar multimedia content labeled with the name, function, known information related to the building/object.

The User Manager 5100 is additionally configured to receive requests for suggested questions. The request comprises, at a minimum, an identification of a user. The identification of a user can be, without limitation, a name, a login an email address, a certified introduction from a trusted source or any other token or set of tokens that uniquely identifies a user within the network. The identification could comprise a user ID on a social networking website. In one embodiment, the identification of a user refers to the requesting user. In one embodiment, the identification of the user can refer to a second user (i.e. other than the requesting user.)

In one embodiment, requests for suggested questions are triggered by a user-initiated event, such as a user taking a user interface action on a proxy device or when a user speaks a keyword or key phrase into an cell phone or PDA. In one embodiment, the User Manager 5100 can automatically trigger a suggested question on behalf of the user on a periodic basis, such as every hour. In one embodiment, the User Manager tracks multiple spatial, temporal, topical or social variables in a user's current context and triggers a request for a suggested question when any such variables change. In one embodiment, the change in the requesting user's current context data can be change in the state of a sensor associated with the requesting user. In one embodiment, the change in the requesting user's current context data can be change in the user's physical location (detected, for example, through a geo-locatable proxy device.)

The User Manager 5100 is additionally configured to transmit questions modified by the Query Analyzer Manager 5200 or identified by the Question Manager 5300 (described in more detail below) back to questioning users and to receive selections of questions from questioning users. The User Manager 5100 is additionally configured to transmit knowledge data identified by the Question Manager 5300 in response to user questions back to the questioning users 5140. Data transmitted to questioning users 5140 can be formatted in any electronic format suitable for consumption or display by a user device such as, for example, HTML or XML documents. In one embodiment, data is transmitted to questioning users 5140 via an API.

The User Manager 5100 is additionally configured to receive answers to posted questions from answering users 5160. The User Manager 5100 can provide an interface to allow answering users 5160 to browse questions posted by questioning users 5140. In one embodiment, answers can include data objects, such as media objects, text objects, formatted documents and so forth. In one embodiment, the User Manager 5100 provides an API that allows third party applications on user proxy devices to display questions and post answers to questions.

The Query Analyzer Manager 5200 provides facilities to analyze and augment user questions received by the User Manager 5100. In one embodiment, for each question received by the User Manager 5100, the Query Analyzer Manager 5200 uses the identification of users and question criteria to a formulate queries so as to search, via the network, for user profile data, social network data, spatial data, temporal data and topical data that is available via the network (including network databases 5800 and sensors 5700) and relates to the question criteria and the identified user so as to identify user context data relevant to question criteria. If a data object is included in the question criteria, the Query Analyzer Manager 5200 can process the data object to help further define the object by, without limitation, extracting keywords from the object content, extracting metadata from the object, classifying the object using an image classifier, deriving a checksum, or deriving a signature from the object.

In one embodiment, the Query Analyzer Manager 5200 is further configured, to use user context data to add additional criteria to questions to create modified questions qualified with user context data. The additional criteria can be any kind of spatial, temporal, social or topical criteria that qualify, personalize and refine the original question so as to form a more specific and targeted question. In one embodiment, the original question criteria and the additional question criteria can formed into multiple questions that can range in specificity or relate to alternative topics.

The Question Manager 5300 provides facilities that allow users to access and knowledge data stored in the knowledge databases 5800. In one embodiment, the Question Manager 5300 can receive modified questions from the Query Analyzer Manager 5200. In one embodiment, the Question Manager 5300 can receive unmodified questions from the User Manager 5100. In one embodiment, the Question Manager 5300 can receive selected questions from the User Manager 5100.

In one embodiment, the Question Manager 5300 uses the identification of users and question criteria to formulate queries so as to search, via the network, for knowledge data, user profile data, social network data, spatial data, temporal data and topical data that is available via the network (including network databases 5800, sensors 5700, and knowledge databases) and relates to the question criteria and the identified users so as to identify knowledge data relevant to the user and question criteria. In one embodiment, identified knowledge data is passed to the User Manager 5100 for transmission back to questioning users 5140. The identified knowledge data retrieved by the queries can be an exact match to the question criteria, or can be a close fit.

In one embodiment, knowledge data comprises questions and answers entered by a plurality of users. In one embodiment, the knowledge data additionally comprises an identification of each of the plurality of users who entered the questions and answers. In one embodiment, the knowledge data additionally comprises spatial, temporal, social and topical data that related to each of the plurality of users who entered the questions and answers at the time such questions and answers were entered (that is to say, the context of the users at the time the questions and answers were entered.)

In one embodiment, the knowledge data for each question and answer additionally comprises an identification of at least one of a plurality of users who have consumed the knowledge data (e.g. any users who have viewed the knowledge data.) In one embodiment, the knowledge data additionally comprises spatial, temporal, social and topical data that related to each of the plurality of users who have consumed the knowledge data at the time the data was consumed (e.g., the context of the users viewing the knowledge data at the time the knowledge data was viewed.)

In one embodiment, the knowledge data additionally comprises a selection of a best answer, wherein the user who originally entered the question has selected a best answer from among the answers posted. In one embodiment, the knowledge data for at least some questions and answers additionally comprises consumption popularity data (e.g. the number of times a question or answer was selected or viewed.) In one embodiment, the knowledge data for at least some questions and answers additionally comprises annotations which, in one embodiment, can be entered by any user of the system. In one embodiment, the knowledge data for at least some answers additionally comprises ratings of the answer's usefulness by users, which can be entered by the questioning user or by consuming users.

In one embodiment, the Question Manager 5300 can receive requests for suggested questions from the User Manager 5100, each request comprising at least an identification of a user. In one embodiment, for every request for a suggested question, a query is formulated so as to search, via the network, for knowledge data, user profile data, social network data, spatial data, temporal data and topical data and relates to the identified user so as to identify knowledge data relevant to the user's current context. In one embodiment, the Question Manager 5300 only identifies questions that are responsive to the requests for suggested questions. In one embodiment, the Question Manager 5300 identifies questions and answers that are responsive to the requests for suggested questions. In one embodiment, the identified knowledge data is passed to the User Manager 5100 for transmission back to questioning users 5160.

In one embodiment, if only questions are initially retrieved by the Question Manager 5300, the User Manager 5100 can present the questions to requesting users 5140 for selection and receive selections of suggested questions from the users. The Question Manager 5300 can then use the selected questions to formulate queries so as to search, via the network, for knowledge data, user profile data, social network data, spatial data, temporal data and topical data and relates to selected question criteria and the identified user so as to identify knowledge data relevant to the identified user and the selected questions. In one embodiment, the identified knowledge data is passed to the User Manager 5100 for transmission back to requesting users 5160.

In one embodiment, when a suggested question is selected by a user, the Question Manager 5300 updates the knowledge database 5900 to reflect the fact the question has been selected by the user. In one embodiment, the number of times a question has been selected is stored on the knowledge database. In one embodiment, the context of every user that has selected the question is recorded on the knowledge database. In one embodiment, selection count data can be used to rank the identified knowledge data transmitted to the end user.

In one embodiment, the Question Manager 5300 can rank identified knowledge data is based on the closeness of fit between the modified question criteria and the identified knowledge data. In one embodiment, the Question Manager 5300 can rank identified knowledge data based the closeness of fit between the context of the user entering the original question, and the current or historical context of the users who entered the knowledge data relating to the user's questions. (e.g. the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was collected.)

In one embodiment, the Question Manager 5300 can rank identified knowledge data based the closeness of fit between the context of the user entering the original question, and the current or historical context of the users who consumed the knowledge data relating to the user's questions. (e.g. the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.)

In one embodiment, the Question Manager 5300 is configured to add questions to the knowledge databases 5800 when a user enters a question that has not previously been posed. In one embodiment, each question added to the knowledge databases comprises an identification of a user and at least one question criteria, which may include data objects. In one embodiment, for each question added to the knowledge database, the Question Manager 5300 adds spatial, temporal, social and topical data that related the user who entered the question at the time the question was entered (that is to say, the context of the user at the time the question was entered.) In one embodiment, if a question contains a data object, the data object is added to the knowledge database in association with the question. In one embodiment, if the same question is asked by more that one user, the context of every user entering the question is added to the knowledge database in association with the question.

In one embodiment, the Answer Manager 5400 is configured to add answers to the knowledge databases 5800 when a user answers a question using, in one embodiment, a user interface provided by the User Manager 5100. In one embodiment, each answer added to the knowledge databases comprises an identification of a user and answer data, which can include text, and other data objects such as media objects. In one embodiment, for each question added to the knowledge database, the Answer Manager 5400 adds spatial, temporal, social and topical data that related the user who entered the answer at the time the question was entered (that is to say, the context of the user at the time the answer was entered.) In one embodiment, the Answer Manager is further configured to receive selections of best answers, wherein the user who originally entered the question has selected a best answer from among the answers posted.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
    receiving a question, by a computing device over a network, from a questioning user using an online question and answer site, the question and answer site comprising questions posed by users and answers submitted by other users, the question comprising an identification of a user and question criteria;
    formulating, by the computing device in the online question and answer site and based on the identification of the user and the question criteria, a first query so as to search, via the network, using a global index that relates entities known to the network with one another, for user profile data, social network data, spatial data, temporal data and topical data that is available via the network and relates to the question criteria and the identified user so as to identify user context data relevant to the question criteria;
    modifying the question, via the network, using the user context data to create a modified question having additional criteria based on the user context data;
    formulating, by the computing device in the online question and answer site and based on the modified question, a second query so as to search, via the network, using the modified question criteria and the user identification so as to identify knowledge data relevant to the identified user and the modified question criteria, wherein the knowledge data comprises questions and answers entered by a first plurality of users and the knowledge data for each question and answer additionally comprises an identification of one of a second plurality of users who consumed the knowledge data, a selection by the questioning user of a best answer from among posted answers, and consumption popularity data; and
    transmitting, by the computing device over the network, the identified knowledge data to the questioning user.

2. The method of claim 1 wherein the knowledge data for each question and answer additionally comprises spatial, temporal, social and topical data that related to each of the first plurality of users who entered the knowledge data at the time the knowledge data was entered.

3. The method of claim 2 wherein the identified knowledge data is ranked based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

4. The method of claim 1 wherein the knowledge data for each question and answer additionally comprises spatial, temporal, social and topical data that related to each of the second plurality of users who consumed the knowledge data at the time the knowledge data was consumed.

5. The method of claim 4 wherein the identified knowledge data is ranked based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was consumed.

6. The method of claim 1 wherein the identified knowledge data transmitted to the questioning user is filtered using user preferences comprising spatial, temporal, social and topical criteria.

7. A method comprising:
    receiving a request for a suggested question, by a computing device over a network, from a requesting user using an online question and answer site, the question and answer site comprising questions posed by users and answers submitted by other users, the question comprising an identification of a user;
    formulating, by the computing device in the online question and answer site and based on the identification of the user, a first query so as to search, via the network, using a global index that relates entities known to the network with one another, for knowledge data, user profile data, social network data, spatial data, temporal data and topical data available to the network that relates to the user identification so as to identify knowledge data relevant to a current context of the identified user, wherein the knowledge data comprises questions and answers entered by a first plurality of users and the knowledge data for each question and answer additionally comprises an identification of one of a second plurality of users who consumed the knowledge data, a selection by the questioning user of a best answer from among posted answers, and consumption popularity data;
    transmitting, by the computing device over the network, the identified knowledge data to the requesting user.

8. The method of claim 7 wherein the request is automatically submitted on behalf of the requesting user in response to a trigger event.

9. The method of claim 8 wherein the trigger event is the expiration of a time interval.

10. The method of claim 8 wherein the trigger event is a change in the requesting user's current context data.

11. The method of claim 10 wherein the change in the requesting user's current context data is a change in the requesting user's current physical location.

12. The method of claim 10 wherein the change in the requesting user's current context data is a change in the state of a sensor associated with the requesting user.

13. The method of claim 7 wherein the knowledge data for each question and answer additionally comprises spatial, temporal, social and topical data that related to each of the first plurality of users who entered the knowledge data at the time such knowledge data was entered.

14. The method of claim 13 wherein the identified knowledge data is ranked based on the closeness of fit between social network data, spatial data, temporal data and topical data that is available, via the network, that relates to the identified user and the spatial, temporal, social and topical data that related to each of the first plurality of users who entered the identified knowledge data at the time the identified knowledge data was entered.

15. The method of claim 7 wherein the knowledge data for each question and answer additionally comprises spatial, temporal, social and topical data that related to each of the second plurality of users who consumed the knowledge data at the time the knowledge data was consumed.

16. The method of claim 15 wherein the identified knowledge data is ranked based on the closeness of fit between social network data, spatial data, temporal data and topical data that is available, via the network, that relates to the identified user and the spatial, temporal, social and topical data that related to each of the second plurality of users who consumed the identified knowledge data at the time the knowledge data was entered.

17. The method of claim 7 wherein the identified knowledge data transmitted to the questioning user is filtered using user preferences comprising spatial, temporal, social and topical criteria.

18. A system comprising:
a processor;
a storage medium for tangibly storing thereon program logic for execution by the processor, the program logic comprising:
logic executed by the processor for receiving a question, over a network, from a questioning user using an online question and answer site, the question and answer site comprising questions posed by users and answers submitted by other users, the question comprising an identification of a user and question criteria;
logic executed by the processor for formulating, in the online question and answer site and based on the identification of the user and the question criteria, a first query so as to search, via the network, using a global index that relates entities known to the network with one another, for user profile data, social network data, spatial data, temporal data and topical data that is available via the network and relates to the question criteria and the user identification so as to identify user context data relevant to the question criteria;
logic executed by the processor for modifying the question, via the network, using the user context data to create a modified question having additional criteria based on the user context data;
logic executed by the processor for formulating, in the online question and answer site and based on the modified question, a second query so as to search, via the network, using the modified question criteria and the identified user so as to identify knowledge data relevant to the identified user and the modified question criteria, wherein the knowledge data comprises questions and answers entered by a first plurality of users and the knowledge data for each question and answer additionally comprises an identification of one of a second plurality of users who consumed the knowledge data, a selection by the questioning user of a best answer from among posted answers, and consumption popularity data; and
logic executed by the processor for transmitting, over the network, the identified knowledge data to the questioning user.

19. A system comprising:
a processor;
a storage medium for tangibly storing thereon program logic for execution by the processor, the program logic comprising:
logic executed by the processor for receiving a request for a suggested question, over a network, from a requesting user using an online question and answer site, the question and answer site comprising questions posed by users and answers submitted by other users, the question comprising an identification of a user;
logic executed by the processor for formulating, in the online question and answer site and based on the identification of the user, a first query so as to search, via the network, using a global index that relates entities known to the network with one another, for knowledge data, user profile data, social network data, spatial, temporal data and topical data available to the network that relates to the user identification so as to identify knowledge data relevant to a current context of the identified user, wherein the knowledge data comprises questions and answers entered by a first plurality of users and the knowledge data for each question and answer additionally comprises an identification of one of a second plurality of users who consumed the knowledge data, a selection by the questioning user of a best answer from among posted answers, and consumption popularity data; and
logic executed by the processor for transmitting, over the network, the identified knowledge data to the requesting user.

20. Non-transitory computer-readable storage media for tangibly storing thereon computer readable instructions for a method comprising:
receiving a question, over a network, from a questioning user using an online question and answer site, the question and answer site comprising questions posed by users and answers submitted by other users, the question comprising an identification of a user and question criteria;
formulating, in the online question and answer site and based on the identification of the user and the question criteria, a first query so as to search, via the network, using a global index that relates entities known to the network with one another, for user profile data, social network data, spatial data, temporal data and topical data that is available via the network and relates to the question criteria and the user identification so as to identify user context data relevant to the question criteria;
modifying the question, via the network, using the user context data to create a modified question having additional criteria based on the user context data;
formulating, in the online question and answer site and based on the modified question, a second query so as to search, via the network, using the modified question criteria and the identified user so as to identify knowledge data relevant to the identified user and the modified question criteria, wherein the knowledge data comprises questions and answers entered by a first plurality of users and the knowledge data for each question and answer additionally comprises an identification of one of a second plurality of users who consumed the knowledge data, a selection by the questioning user of a best answer from among posted answers, and consumption popularity data; and
transmitting, over the network, the identified knowledge data to the questioning user.

21. Non-transitory computer-readable storage media for tangibly storing thereon computer readable instructions for execution by a processor, the computer readable instructions performing a method comprising:
receiving a request for a suggested question, over a network, from a requesting user using an online question and answer site, the question and answer site comprising questions posed by users and answers submitted by other users, the question comprising an identification of a user;
formulating, in the online question and answer site and based on the identification of the user, a first query so as to search, via the network, using a global index that relates entities known to the network with one another, for knowledge data, user profile data, social network data, spatial data, temporal data and topical data available to the network that relates to the user identification so as to identify knowledge data relevant to a current context of the identified user, wherein the knowledge data comprises questions and answers entered by a first plurality of users and the knowledge data for each question and answer additionally comprises an identification of one of a second plurality of users who consumed the knowledge data, a selection by the questioning user of a best answer from among posted answers, and consumption popularity data; and transmitting, over the network, the identified knowledge data to the requesting user.

* * * * *